United States Patent [19]

Bertini et al.

[11] Patent Number: 5,279,147

[45] Date of Patent: Jan. 18, 1994

[54] METHOD FOR LOCATING DISRUPTIONS IN ELECTRICAL CABLE

[75] Inventors: Glen J. Bertini, Bay City; Miguel J. Chavez, Midland; Dean F. Kawa, Sanford, all of Mich.

[73] Assignee: Dow Corning Corporation, Midland, Mich.

[21] Appl. No.: 873,263

[22] Filed: Apr. 24, 1992

[51] Int. Cl.$^5$ ............................................. G01M 3/28
[52] U.S. Cl. ........................................ 73/40; 73/37; 73/40.5 R
[58] Field of Search ................. 73/37.5, 40, 40.5 R, 73/49.1, 37

[56] References Cited

U.S. PATENT DOCUMENTS

| | | | |
|---|---|---|---|
| 882,141 | 3/1908 | Cope | 73/40.5 R |
| 1,985,348 | 12/1934 | Henneberger | 73/40.5 R |
| 3,304,546 | 2/1967 | Kern et al. | 73/40.5 R |
| 3,505,513 | 4/1970 | Fowler et al. | 73/40 |
| 3,664,357 | 5/1972 | Kreiss | 73/40.5 R |
| 3,690,150 | 9/1972 | Mullen | 73/40.5 R |
| 3,695,094 | 10/1972 | Hulme | 73/40.5 R |
| 3,987,662 | 10/1976 | Hara et al. | 73/40.5 R |
| 4,201,079 | 5/1980 | Worcester | 73/40.5 R |
| 4,306,446 | 12/1981 | Fukuda | 73/40.5 R |
| 4,727,748 | 3/1988 | Horigome et al. | 73/40 |
| 5,082,449 | 1/1992 | Borgstrom | 439/88 |

FOREIGN PATENT DOCUMENTS 228897 10/1985 Fed. Rep. of Germany ... 73/40.5 R

Primary Examiner—Hezron E. Williams
Assistant Examiner—Michael J. Brock
Attorney, Agent, or Firm—Richard I. Gearhart; Alexander Weitz

[57] ABSTRACT

An apparatus and method for locating an obstruction, leak or fault in an electrical cable segment, and determining the extent thereof, comprising a method and apparatus for supplying an interruptible pressurized gas to the cable's interstitial void space, first and second valves for directing the flow of the gas, a first device for acquiring data on the flow rate of gas to or from the interstitial void space and generating a first electronic signal proportional thereto, the first flow data acquisition device being in gaseous communication with the first valve, a second device for acquiring data on the flow rate of gas to or from the interstitial void space and generating a second electronic signal proportional thereto, the second flow data acquisition device also in gaseous communication with the second valve, and a method and apparatus for numerically relating the first and second electronic signals generated by the first and second data acquisition devices to determine the location and extent of the leak or blockage.

8 Claims, 5 Drawing Sheets

METHOD FOR LOCATING DISRUPTIONS IN ELECTRICAL CABLE

FIELD OF THE INVENTION

The present invention relates to the restoration of an inservice underground electrical distribution cable. More particularly, the instant invention relates to a method for locating a leak or obstruction in a cable having a stranded conductor and determining the extent thereof prior to the introduction of an antitreeing agent or water block composition of the prior art.

BACKGROUND OF THE INVENTION

A major problem associated with electrical distribution cable is its tendency, over a period of time, to fail due to the progressive degradation of its insulation. The degradative processes involved in the failure of cables are correlated with two "treeing" phenomena. "Electrical treeing" is the product of numerous electrical discharges in the presence of strong electrical fields which eventually lead to the formation of voids within the insulation material. These voids resemble the trunk and branches of a tree in profile under microscopic observation, from which the descriptive terminology derives. As the trees formed by this process grow, they provide further routes along which corona discharges can occur, the cumulative effect being electrical breakdown of the insulation. Electrical treeing generally occurs when large voltages are imposed on the cable. The degradative results of the electrical treeing process can be precipitous such that the electrical cable can break down in a relatively short period of time.

The second type of treeing, known as "water treeing," is observed when the insulation material is simultaneously exposed to moisture and an electric field. This mechanism is much more gradual than electrical treeing, requiring an extended period of time to cause the degree of damage that affects the insulation characteristics of the distribution cable. However, since water treeing occurs at considerably lower electrical fields than required for the formation of electrical trees, this phenomenon is a leading cause of reduced service life of cables which allow water entry to the insulator region, whether through diffusion or some other mechanism.

Efforts have been made to prepare cables which are resistant to water treeing by incorporating an anti-tree additive (e.g., certain organosilanes) directly into the insulation composition of the cable at time of manufacture. Additionally, it is known to minimize deterioration by limiting the amount of water which can enter the cable interior by introducing a curable, e.g., silicone "water block" composition into the cable's interior and subsequently crosslinking this composition therein. However, these methods only address the issue of how to inhibit the formation of trees and the associated deterioration of insulation integrity. Thus, the skilled artisan will recognize that a vast network of underground cable is already in place wherein the cable either has not been treated according to one of these procedures or it has degenerated significantly despite such efforts and is, therefore, subject to premature failure.

As a partial answer to industry's desire to extend the useful life of existing underground cables, it has been found that certain liquid tree retardants can be introduced into the cable's interior to partially restore the insulation performance. For example, phenylmethyldimethoxysilane can be pumped in to fill the intersticial void space between the stranded conductor and the conductor shield of the cable: the silane is then allowed to diffuse into the cable's insulation to fill the electrochemical trees therein. This restorative procedure can then be followed by the introduction of a water block composition, as mentioned above.

It will be appreciated, however, that these techniques require the pumping of liquids having viscosities in the range of about one to 100 cP at 25° C. through the interior of the cable. The success of this procedure therefore relies on the availability of an unobstructed path in the cable under consideration. In a typical field situation, however, a partial or total blockage of the cable segment is often encountered; this vitiates the utility of the above described restorative methods. Such a blockage can arise in several ways. For example, corrosion of the conductor strands due to the ingress of water or the accumulation of standing water in the conductor area can lead to partial or total blockage of the interstitial void space. More typically, the obstruction is due to the presence of one or more splices, elbows or other connections along the cable segment. These too can partially or completely block the flow of liquid and thereby thwart any intended restorative attempts. Additionally, such connections can develop leaks over time or they may contain leaks from improper installation. Leaks are also undesirable since they can promote electrical breakdown, facilitate the penetration of water into the cable and result in the waste of restorative fluids when the latter are introduced. Leaks may also be formed when a cable faults electrically, in which case an electrical discharge burns a hole in the cable insulation causing a failure and leak therein. For the purposes herein, the generic term "disruption" will be used to refer to such leaks, partial obstructions or complete obstructions, individually or in combination.

In general, an electrical utility will have no knowledge of the presence or location of these disruptions in any given cable segment selected for restoration (e.g., it has been in service for considerable time or has actually failed). Since the systematic elimination of such disruptions prior to cable restoration generally necessitates the unearthing of buried cable, their locations must be ascertained as accurately as possible in order to avoid the excessive time and expense of unproductive excavation. Moreover, since much of this excavation takes place on the lawns of private residences, there is also strong motivation to minimize guesswork and the associated complaints of irate home owners. Toward this end, the art has made only limited progress. For example, it is known to determine whether a cable segment is completely blocked by applying a gas flow to one end thereof in series with a rotometer by noting the eventual cessation of flow.

Two relatively sophisticated electronic methods which can precisely locate a splice, elbow or termination along the cable segment are also currently available. The first, time domain reflectometry (TDR), is based on a radar-like principle wherein an electrical pulse is propagated along the conductor of the cable and the impedance mismatch of, e.g., a splice within the cable segment generates an electronic reflection or echo which can be plotted on an oscilloscope and used to calculate its location. A second method uses a radio tone generator to send a radio signal down the conductor of the cable segment, this signal being returned to the source via the concentric neutral wire of the cable. Perturbations in the strength of this signal due to the different conductor and neutral wire geometries associated with, e.g., a splice can then be analyzed to determine the locations thereof. Even though the above mentioned electronic methods are quite accurate in locating a splice they are not useful in the determination of other types of disruptions. Nor can they establish the extent of blockage of splices elbows or terminations. Furthermore, when complete blockage of a given cable segment containing two or more such splices is established, these methods can not be used to determine which of these is the restrictive device. These electronic methods also can not locate a splice or elbow which is near an end of a cable segment.

SUMMARY OF THE INVENTION

Applicant has now discovered a relatively quick and reliable method for locating the above described disruptions in a buried cable segment and determining the extent thereof prior to carrying out the conventional steps of cable restoration.

The instant invention therefore relates to a method for identifying a disruption in a segment of an electrical cable which has a central stranded conductor encased in a conductor shield, the latter being surrounded by a polymeric insulation cover, said method comprising:

(I) fitting a first gas flow measuring means to said cable segment, said first measuring means being capable of monitoring the influx of a gas flow to any void space between said conductor strands and said conductor shield;

(II) fitting a second gas flow measuring means to said cable segment at some distance relative to said first gas flow measuring means, said second measuring means being capable of monitoring the efflux of said gas;

(III) introducing a gas flow to said first measuring means; and (IV) observing the relationship between the influx and efflux of said gas flow through said cable segment to determine the extent and location of the disruption.

The invention further relates to an apparatus for performing the above method.

DESCRIPTION OF THE PREFERRED EMBODIMENT

For the purposes of the present invention, the cable segment to be tested is generally of the type used in underground residential distribution and typically comprises a central core of a stranded copper or aluminum conductor concentrically encased in a semi-conducting, polymeric conductor shield so as to define an intersticial void space in the region of the conductor and along the length of the cable segment. The conductor shield, in turn, is concentrically surrounded by a polymeric insulation cover which is typically extruded thereover. As is well known in the art, these cables usually also comprise a semi-conducting insulation shield surrounding the insulation, the insulation shield commonly being wrapped with a wire or metal foil grounding strip and, optionally, further surrounded by an outer polymeric protective jacket. The insulation is preferably polyethylene or cross-linked polyethylene while the conductor shield material is preferably a polyolefin polymer, such as polyethylene or a copolymer of polyethylene and propylene, or vinyl acetate. As used herein, the term "in-service" refers to a cable which has been under electrical load and exposed to the elements for an extended period. In such a system, the electrical integrity of the cable insulation has generally deteriorated to some extent due to the formation of water trees, as described above.

Figure 1:
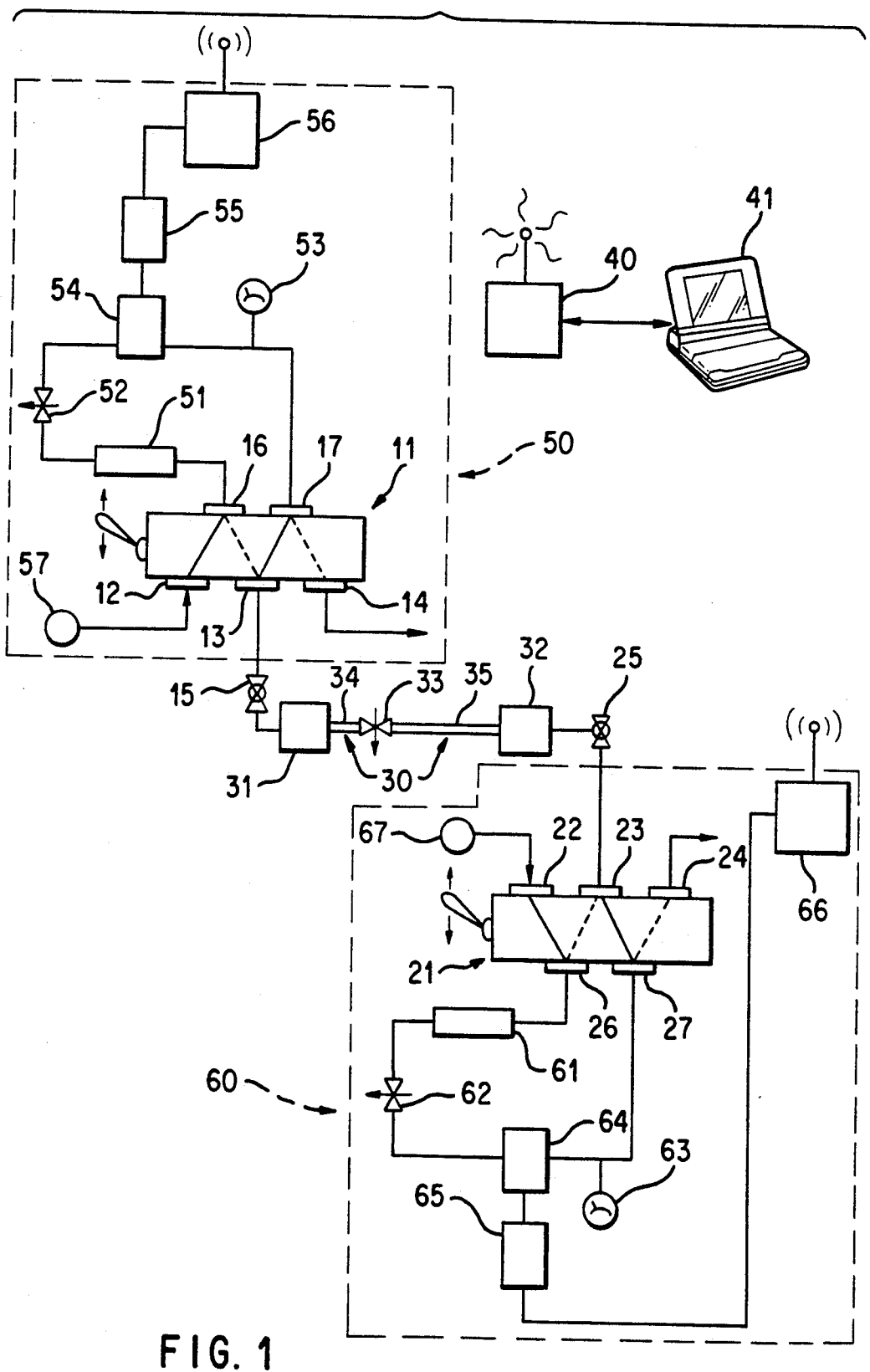
FIG. 1 is a schematic diagram of the preferred embodiment of the instant apparatus in conjunction with a cable segment having a simulated partial obstruction.

The apparatus which is preferably used in the practice of the present invention is illustrated in schematic fashion in FIG. 1 for the case wherein the cable segment has a partial obstruction. Here, the segment 30 is divided into sub-segment 34 and sub-segment 35, these sub-segments being separated by the partial obstruction, represented by needle valve 33. At one end of cable segment 30, there is attached a gas-tight connector 31 for introducing a gas flow to the void space in the conductor region thereof. A gas line from connector 31 enters a first flow data acquisition unit 50 after passing through ball valve 15, said ball valve being used to interrupt the flow of gas to (or from) cable segment 30, as described infra. From ball valve 15, a gas line is connected to port 13 of 4-way valve 11 so as to pneumatically communicate with port 17 of 4-way valve 11 when this valve is in the forward position (solid lines). Four-way valve 11 is also supplied with an exit port 14 and a gas supply port 12, the latter being connected to a pressurized gas supply 57 (e.g., nitrogen, air, helium) and in pneumatic communication with port 16 of 4-way valve 11 when this valve is in the forward position shown by the solid lines. A gas line connects port 16 of 4-way valve 11 to gas filter/drier 51 and then to control needle valve 52. This gas line then passes through mass flow meter 54 before returning to port 17 of 4-way valve 11. Four-way valve 11 is thus used to either direct the gas flow to the cable segment 30, or to direct gas flow from the cable segment 30 through meter 54 and then exit port 14. A pressure transducer 53 is tapped into the gas line near the point of exit from flow meter 54 and is capable of measuring the pressure at this point. Mass flow meter 54 is capable of instantaneously measuring the gas flow in the loop between ports 16 and 17 and generating an electronic signal proportional thereto. This electronic signal is fed to analog/digital (A/D) converter 55 and transformed into a digital signal for computer analysis. The digitized signal output of A/D converter 55 is then fed into radio modem 56 and converted to a digitized radio signal to be transmitted to digital receiver 40 and processed in digital computer 41, as described infra.

An entirely similar assortment of components is symmetrically disposed at the other end of cable segment 30, as shown in FIG. 1. Thus, gas-tight connector 32 is connected to a second flow data acquisition unit 60 after passing through ball valve 25, from which a gas line is connected to port 23 of 4-way valve 21. As shown by the dotted lines, when 4-way valve 21 is in the reverse position, port 23 pneumatically communicates with port 26. Four-way valve 21 is also supplied with an exit port 24 and a gas supply port 22, the latter being connected to pressurized gas supply 67 and in pneumatic communication with port 26 of 4-way valve 21 when this valve is in the forward position (solid lines). A gas line connects port 26 of 4-way valve 21 to gas filter/drier 61 and then to control needle valve 62. This gas line then passes through mass flow meter 64 before returning to port 27 of 4-way valve 21, pressure transducer 63 being tapped into this line. Mass flow meter 64 measures the gas flow in the loop between ports 26 and 27 and generates an electronic signal proportional thereto. This electronic signal is fed to A/D converter 65 and transformed into a digital signal. The digitized signal output of A/D converter 65 is fed into radio modem 66 and converted to a digitized radio signal to be transmitted to digital receiver 40 and processed in digital computer 41, as above.

The operation of the above apparatus according to a preferred method of the present invention will now be illustrated for the case of the partial obstruction shown in FIG. 1.

A segment of electrical cable was cut into two lengths of 256 feet and 103 feet, respectively. The cable was manufactured by the Hendrix Wire and Cable Co. (Milford, N.H.) and had a designation of 1/0. It comprised a conductor of 19 strands of 0.0745 inch (0.189 cm) diameter aluminum, an extruded conductor shield and a cross-linked polyethylene insulation having an outer diameter of about 1.0 inch. A partially closed needle valve 33 (simulation of a partial blockage) was used to connect these segments such that the longer cable portion corresponded to sub-segment 34 in FIG. 1. The total cable segment was then connected to the ball valves 15 and 25 and then to the first and second flow data acquisition units, 50 and 60, respectively, as shown in FIG. 1. Within these units, the mass flow meters 54 and 64 were calibrated to measure the volumetric flow rate of nitrogen gas at 25° C. and 14.7 psia and were obtained from MKS Instruments, Andover, Mass. (Part #0258C-00200-SV). The A/D converters 55 and 65 were Part #D1131 obtained from Omega Engineering, Inc. (Stamford, Conn.) and the radio modems 56 and 66 were Part #85 obtained from Electronic System Modem (Kennewick, Wash.). The pressure transducers 53 and 63 were Part #PX95-030GI obtained from Omega Engineering, Inc. The other components were standard valves, fittings, displays, etc., and were obtained from various scientific supply houses.

The following step-by-step procedure was then carried out.

1. Ball valve 15 was closed and pressurized nitrogen gas was supplied to port 12 such that the pressure at transducer 53 was 15.2 psig (zero flow through meter 54). Four-way valve 11 was toggled to the reverse position (dotted lines) and port 13 was disconnected to completely vent the system to the environment. Four-way valve 11 was then toggled to the forward position (solid lines) and the resulting flow of nitrogen was set at 190 ccm (cubic centimeters per minute) using control valve 52. This initial set-up procedure was repeated at the other side of the cable segment. The gas lines were then reconnected to ports 13 and 23 as shown in FIG. 1.

2. Maintaining the above pressure and control valve settings, ball valve 15 was closed and ball valve 25 was opened. Four-way valve 21 was toggled to the reverse position (dotted lines in FIG. 1) and 4-way valve 11 was toggled to the forward position (solid lines).

Figure 2:
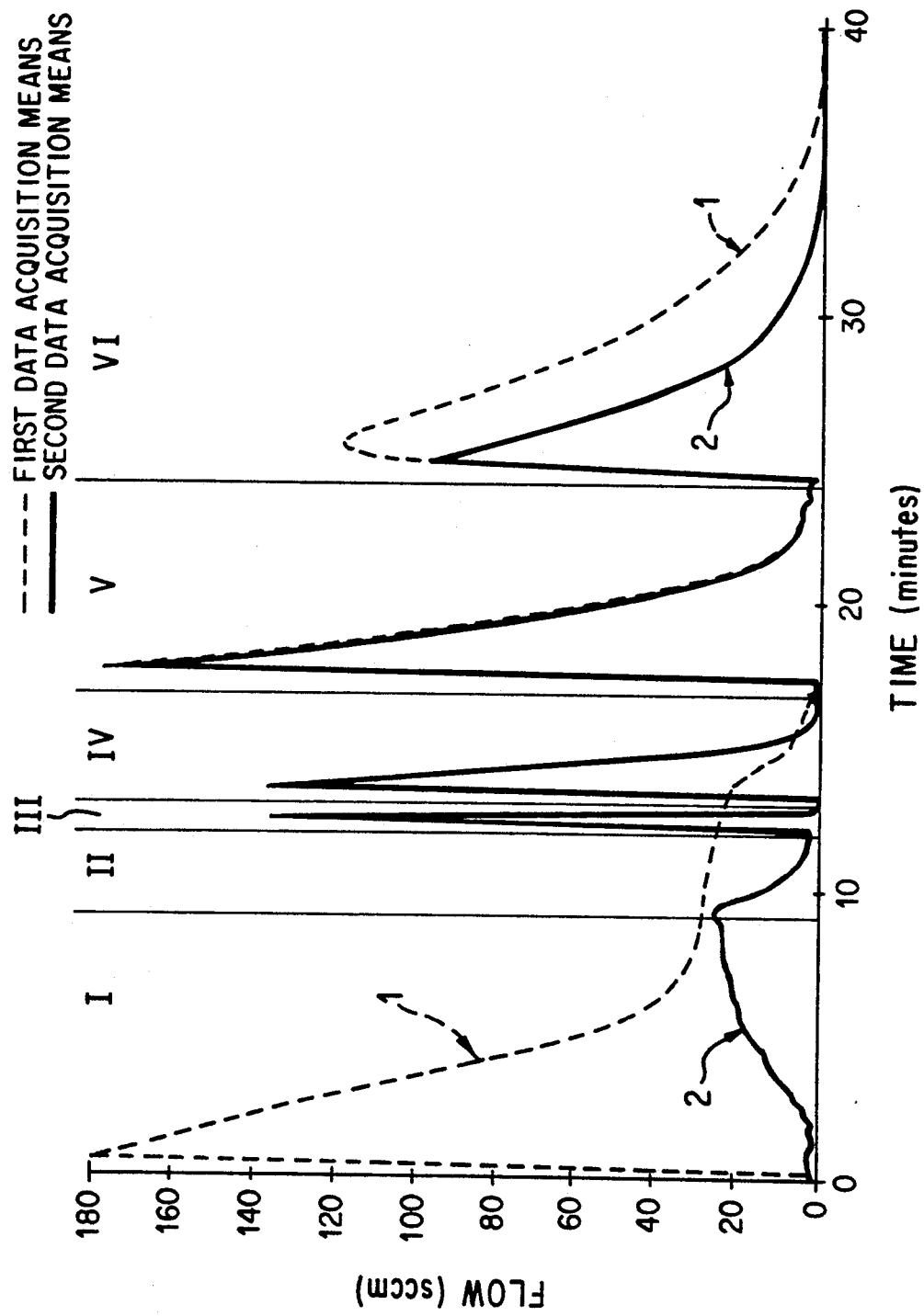
FIG. 2 is a printout of the computer-acquired flow rates, as a function of time, obtained with the apparatus of FIG. 1 according to the method of the present invention.

3. When each flow meter registered zero, ball valve 15 was opened and the flow through the first data acquisition unit 50 and the second data acquisition unit 60 were recorded on digital computer 41 until a steady state was observed. These flow rate versus time curves are shown in FIG. 2 (Region I), wherein 1 and 2 refer to the first and second flows at meters 54 and 64, respectively.

4. Ball valve 25 was closed and the flow rate 2 in data acquisition unit 60 decreased to about zero, as shown in Region II of FIG. 2. At this point, 4-way valve 21 was toggled to the forward position (solid lines in FIG. 1) and the associated spike in flow rate 2 was observed, as shown in Region III of FIG. 2.

5. When flow rate 2 again dropped to about zero, ball valve 25 was opened. The resulting flow curves are shown in Region IV of FIG. 2. Each flow curve was electronically integrated in each of the above described regions (with the exception of flow 2 in Region III). The integrated area of flow curve 2 was subtracted from that of flow curve 1 in Region I and Region II and the result was added to the sum of the integrated areas of these flow curves in Region IV and the integrated area of flow 1 in Region III. This sum of integrated areas represents the total volume of gas injected into the cable segment at the calibrated temperature of 25° C. (77° F.) and pressure of 14.7 psia, and was calculated as $V_o = 926$ cc. To convert this to the volume $V_g$ of gas injected at the actual test conditions (68° F., 15.2 psig), the ideal gas law was used:

$$V_g = V_o \{(460+68)/(460+77) \times (14.7)/(14.7+15.2)\} = 448 \text{ cc.}$$

A further calculation was then performed to account for the air originally present in the cable segment at 68° F./14.7 psia and subsequently compressed to $P = 15.2$ psig:

$$V = V_g (P + 14.7)/P = 448 (15.2 + 14.7)/15.2 = 881 \text{ cc,}$$

wherein V now represents the total volume of gas in the cable. From this, the total length of cable segment 30, denoted herein by L, was calculated as $L = V/A$, wherein A is the calculated cross-sectional area of the void space in the conductor region.

The area A may be calculated for the general case of a cable having an extruded conductor shield by noting the geometry of the conductor as follows:

$$A = \pi \{r(2s-1)\}^2 - n\pi r^2 - 6(s-1)\left[\frac{\pi\{(2s-1)r\}^2}{6(s-1)} - r\sqrt{\{(2s-2)r\}^2 - r^2} - \pi r^2 \{\tfrac{1}{2} + 1/(6(s-1))\}\right]$$

where
- n = the number of individual conductor strands.
- s = the number of stand layers (i.e., s = 1 represents a solid conductor), and r = the radius of an individual strand.

The respective values of n and s are illustrated in Table 1 for cables having two to five strand layers.

TABLE 1

| Number of Strands in Conductor (n) | Number of Layers of Strands (s) |
|---|---|
| 7 | 2 |
| 19 | 3 |
| 37 | 4 |
| 61 | 5 |

It should be noted that the above formula applies only to cables having an extruded conductor shield wherein there is no void space between the outer layer of strands and the shield material. The last (bracketed) term of the above formula would not appear when calculating the void cross-sectional area for a taped conductor shield. Alternatively, the area can be obtained by experimentally determining the internal volume of a fresh cable segment of the type under consideration according to the instant method.

In the above example, the values used were: $n=19$; $s=3$; $r=0.0946$ cm; and $A=0.0787$ cm$^2$. Therefore, $L=V/A=881/0.0787=11,194$ cm$=367$ feet, a good approximation of the actual cable segment length of 359 feet.

6. The ball valves 15 and 25 were closed and 4-way valve 11 was toggled to the reverse position (dotted lines in FIG. 1) to allow the gas in data acquisition unit 50 to escape. This resulted in the nearly overlapping spikes shown in Region V of FIG. 2, which flows were not integrated.

7. When both the first and second flows dropped to zero, ball valves 15 and 25 Were simultaneously opened to initiate a back flow. The resulting flows were again integrated and are displayed in Region VI of FIG. 2. The integral of flow rate 1 in Region VI of FIG. 2, $V_o$ 1, is approximately proportional to the volume of gas injected, at 25° C./14.7 psia, into the sub-segment 34 of cable segment 30. Likewise, the integral of flow 2 in Region VI, $V_{o\,2}$, is approximately proportional to the volume of gas injected (at 25° C./14.7 psia) into sub-segment 35. The calculated values were: $V_{o\,1}=516$ cc and $V_{o\,2}=392$ cc.

These were then converted to the corresponding values at the actual temperature and pressure used in the test using the ideal gas law, as described above: $V_g\,1=249$ cc; $V_g\,2=189$ cc.

These volumes at actual test conditions were modified, as shown above in step 5, to take into account the gas already in the cable:

$$V_1 = V_g\,1\,(15.2+14.7)/15.2 = 491 \text{ cc}$$

$$V_2 = V_g\,2\,(15.2+14.7)/15.2 = 372 \text{ cc}$$

The length $L_1$ of sub-segment 34 was calculated as:

$$L_1 = V_1/A = 491/0.0787 = 6,239 \text{ cm} = 205 \text{ feet}.$$

Similarly, the length $L_2$ of sub-segment 35 was calculated as:

$$L_2 = V_2/A = 372/0.0787 = 4,727 \text{ cm} = 155 \text{ feet}.$$

These calculated values were deemed to be fair approximations of the actual lengths of the cable sub-segments employed in the test. This is particularly true since the partially restricted cable represents the most difficult determination according to the method of the present invention.

Additionally, the total resistance to flow of the above cable sub-segments and the partial obstruction were determined as follows.

The resistance of each data acquisition unit was calculated as $R_o = P/F_o = P/190 = 15.2/190 = 0.0800$ psi/cc/min, where $F_o$ is the flow rate in each data acquisition unit during the set up procedure of step 1.

A cable calibration factor was obtained in a previous experiment wherein a section of fresh cable of the above type was tested to obtain a steady state flow therein. The cable factor was obtained by dividing the calculated resistance of this cable by its known length, said cable factor being found as $f=0.000141$ psi/ft-cc/min. This factor was then used to calculate the resistance of the experimental cable segment of calculated length L:

$$R_c = fL = 0.000141(367) = 0.0517 \text{ psi/cc/min}.$$

From the average steady state flow rate of the first and second data acquisition units, $(F_{ss})_{avg}$, obtained in above step 3, the total resistance of cable segment 30 was calculated as $R = P/(F_{ss})_{avg} = 15.2/(27.6+23.7)/2 = 0.593$ psi/cc/min. Combining these results, the resistance of the obstruction was calculated as $$R_{obs} = R - (R_c + 2\,R_o) = 0.381 \text{ psi/cc/min}.$$

These resistance values could be utilized to determine the advisability of removing the obstruction prior to cable restoration were this an actual field evaluation, such a decision being dependent upon the viscosity of the proposed restorative fluid and the moisture content in the cable, inter alia, as would readily be appreciated by those skilled in the art.

It is also preferred to combine the instant method with one of the other previously mentioned electronic methods (e.g., time domain reflectometry) in an actual field situation. The electronic method would permit the location of any splice or elbow present in the cable segment to be resolved to an accuracy of about $\pm\frac{1}{2}$ foot, while the instant method would allow a quantitative evaluation of the resistance of such obstructions as well as help to locate other types of disruptions. It should also be understood that, even though the above procedure seems complicated, the total evaluation, including real time computer analysis, can be completed in about 10 to 30 minutes when properly executed.

In a similar manner, other cable disruptions can be located and their resistance to flow quantified by the above described method. For the purposes of further clarification, the following will serve to illustrate representative situations commonly found in the field. In each determination, the initial set-up procedure described in above step 1 would be followed, the subsequent valve settings in the six test regions being summarized in Table 2. The same integrations of the flow curves would be followed as in the above example, the exception being noted infra.

TABLE 2

| Region | Ball Valve 15 | Four-way Valve 11 | Ball Valve 25 | Four-way Valve 21 |
|---|---|---|---|---|
| I | open | forward | open | reverse |
| II | open | forward | closed | reverse |
| III | open | forward | closed | forward |

TABLE 2-continued

| Region | Ball Valve 15 | Four-way Valve 11 | Ball Valve 25 | Four-way Valve 21 |
|---|---|---|---|---|
| IV | open | forward | open | forward |
| V | closed | reverse | closed | reverse |
| VI | open | reverse | open | reverse |

Figure 3:
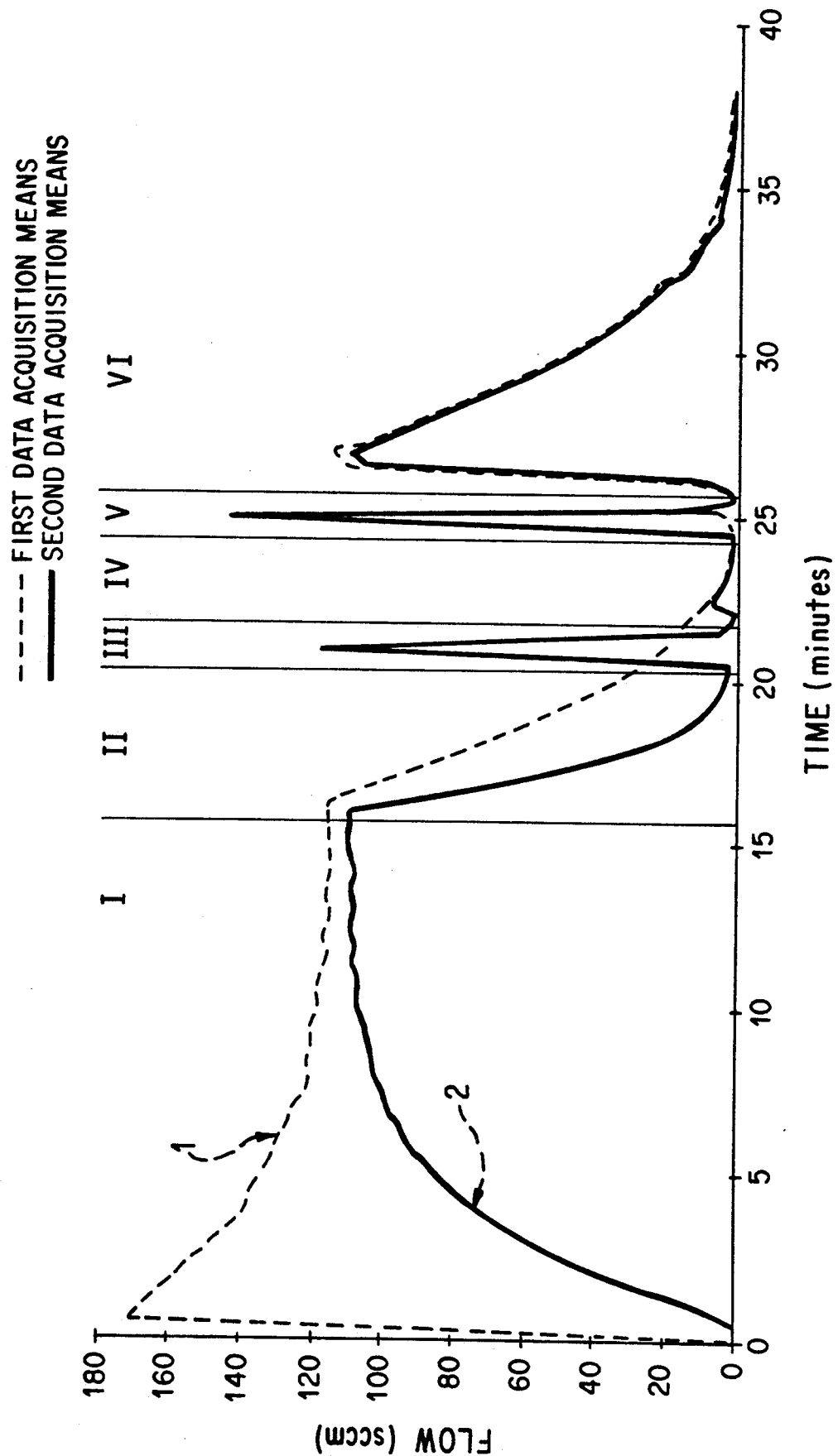
FIG. 3 is a schematic representation of the flow rate curves for the case of a new, unblocked cable segment.

FIG. 3 schematically illustrates the flow curves for the case of an unobstructed cable segment. These appear very similar to those obtained with the above described partial obstruction but the relevant calculations would show that the volume of each (theoretical) sub-segment is approximately the same and that the total measured resistance is substantially identical with the calculated resistance of the unobstructed cable segment. The skilled artisan will recognize that the two flows in Region I would eventually run together in this situation, but it is not necessary to wait that long to obtain reasonable results.

Figure 4:
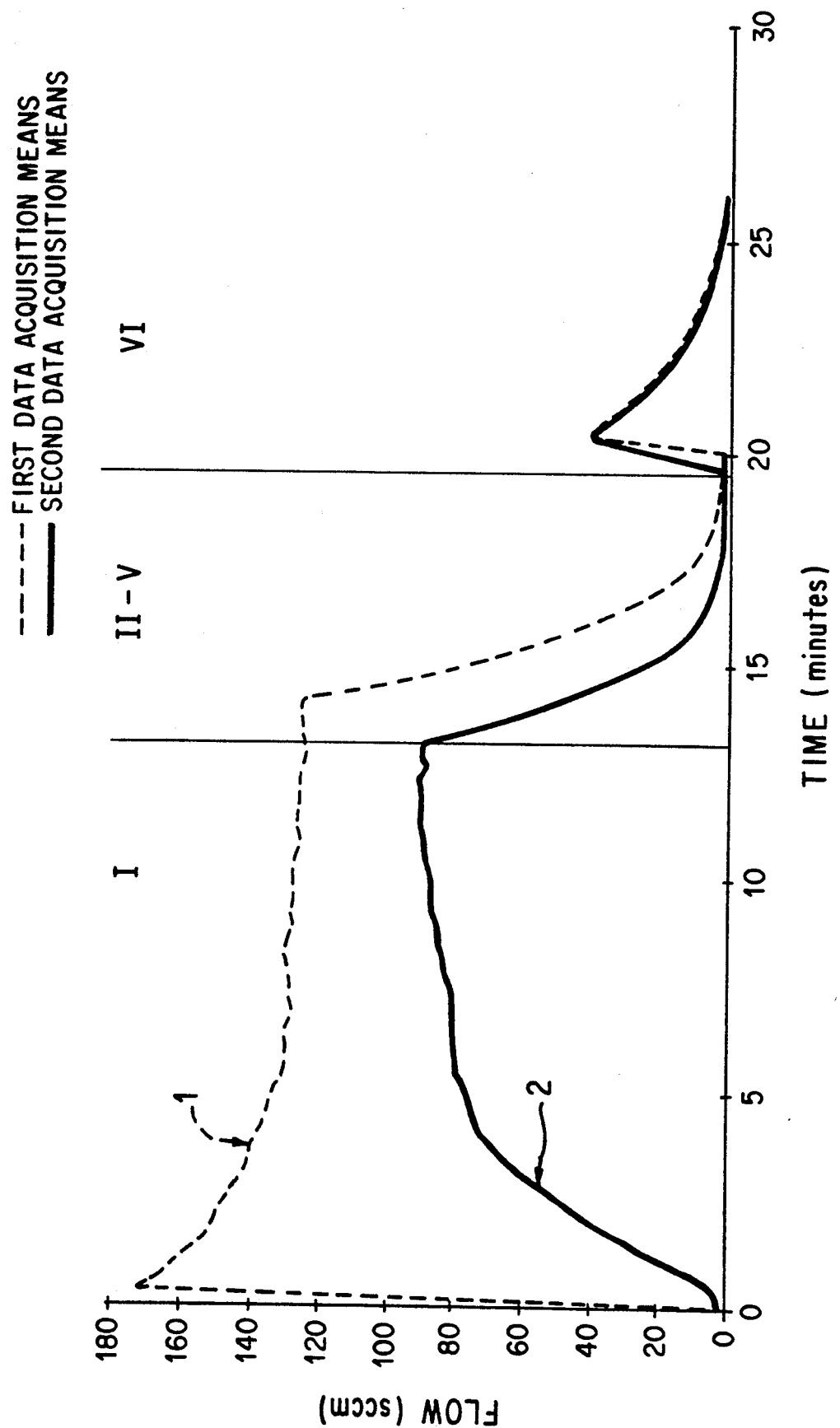
FIG. 4 is a schematic representation of the flow rate curves for the case of a cable segment having a leak therein.

For the case of a cable segment having a leak, the flow curves are schematically depicted in FIG. 4. In such a case, flow 1 and flow 2 would not reach a common steady state value in Region I, the gap therebetween being indicative of the leak. Under these circumstances, the operations associated with Regions II to V should be ignored. From the approximately identical flow curves in Region VI, it can be surmised that the leak is near the middle of the cable segment in this illustration.

Figure 5:
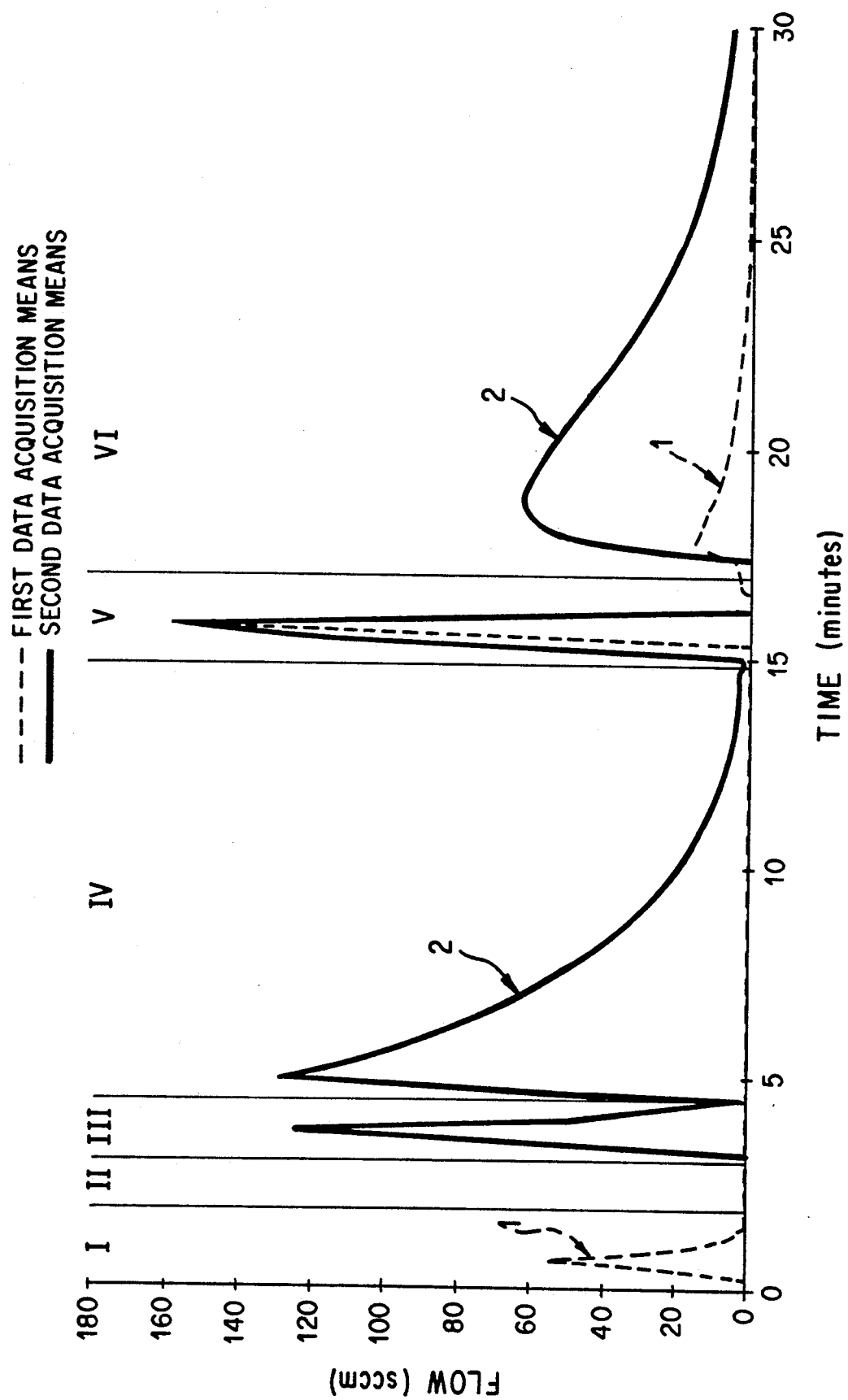
FIG. 5 is a schematic representation of the flow rate curves for the case of a completely blocked cable segment.

FIG. 5 schematically illustrates the flow curves which would be obtained in the case of a completely blocked cable segment. Here, no flow 2 would be obtained in Region I and no flow 1 would be obtained in Region IV. The flows 1 and 2 in Region VI indicate that the complete blockage is located closer to the first data unit in this illustration.

Although not illustrated herein, the case wherein there are two partial obstructions in the cable segment would result in flow curves very much like those shown in FIG. 2. However, in this case, the calculations would show that the sum of the calculated sub-segment lengths is generally considerably lower than the calculated total length of the whole cable segment.

Use of the above described apparatus is preferred in the practice of the present method, but equivalents of the components known in the art may be substituted for the preferred elements. Thus, for example, other means for measuring the gas flow rates, or total mass/volume thereof, contemplated herein include rotometers, balances, bubble counters, graduated cylinders (i.e., inverted in a water bath), inter alia. The outputs of such devices could be coupled to electronic recording means to facilitate data gathering. In place of the radio modems described above, the electronic output of the measuring means could be hard wired to the computer. Other means for interrupting and directing the gas flows include various configurations of servo valves and manual valves. Additional means for processing the signal generated by the flow meters include recording the electronic signals therefrom on a strip chart and determining the required integrals by paper weighing or planimetry. Alternatively, the signal from the flow meters could be monitored on an analog computer and the relevant signals integrated electronically.

It will also be appreciated by those skilled in the art that all of the operations according to the instant method can be carried out while the cable is under power (i.e., energized) by using media injection fittings, such as disclosed in U.S. Pat. No. 5,082,449, hereby incorporated by reference, as connectors 31 and 32 of FIG. 1. This presents a great advantage in terms of time and complexity over prior art techniques such as the above mentioned TDR and tone generator methods, both of which require interruption of power during installation and test.

That which is claimed is:

1. A method for identifying a leak or blockage in a segment of an electrical cable, said cable segment having an interstitial void space, said cable segment further having fitted thereon first and second valves respectively fitted on first and second ends of said cable segment, said first and second valves have opened and closed positions, first and second flow data acquisition means respectively fitted to said first and second valves, said first and second flow data acquisition means each able to measure a gas flow to or from said interstitial void space of said cable segment, comprising the steps of:

introducing a gas flow to said first flow data acquisition means and measuring the flow of said gas as said gas passes through said first flow data acquisition means;

permitting said gas to flow from said first flow data acquisition means into the interstitial void space of said cable segment;

measuring the flow of said gas as said gas passes from said cable segment through said second flow data acquisition means;

creating a backflow through said first and second flow data acquisition means;

measuring said backflow through said first and second data acquisition means; and numerically relating the data obtained from said first and second flow data acquisition means to determine the volume of said gas influxing and effluxing through said cable segment, thereby determining the nature of the leak or blockage and approximating the location of the leak or blockage on said cable segment in relation to the first and second ends of said cable segment.

2. The method according to claim 1, wherein said cable segment is electrically energized during the practice thereof.

3. The method according to claim 1, wherein said first and second flow data acquisition means measure gas flow with a mass flow meter.

4. The method according to claim 1, wherein said data is numerically related with the aid of a digital computer.

5. An apparatus for identifying a leak or blockage in an electrical cable segment, said cable segment having first and second ends, and an interstitial void space, comprising:

means for supplying an interruptible pressurized gas to the interstitial void space;

first and second valves for directing the flow of said gas, said first and second valves disposed respectively on said first and second ends of said cable segment;

first means for acquiring data on the flow rate of gas to or from said interstitial void space and generating a first electronic signal proportional thereto, said first flow data acquisition means in gaseous communication with said first valve;

second means for acquiring data on the flow rate of gas to or from said interstitial void space and generating a second electronic signal proportional thereto, said second flow data acquisition means in gaseous communication with said second valve; and means for numerically relating the first and second electronic signals generated by the first and second data acquisition means to determine the volume of said gas influxing and effluxing through said cable segment, thereby determining the location and extent of the leak or blockage.

6. The invention of claim 5, wherein the first and second flow data acquisition means measure gas flow with a mass flow meter.

7. The invention of claim 5, wherein said first and second electronic signals are transformed to digital signals with an analog/digital converter.

8. The invention of claim 7, wherein said first and second digital signals are transmitted to first and second digital receivers via first and second radio modems, said first and second radio modems in electrical communication with a digital computer which numerically relates said signals.

* * * * *